United States Patent
Kniplitsch et al.

(10) Patent No.: US 8,984,093 B2
(45) Date of Patent: Mar. 17, 2015

(54) METHOD AND APPARATUS FOR ARBITRATION OF TIME-SENSITIVE DATA TRANSMISSIONS

(71) Applicant: Marvell World Trade Ltd., St. Michael (BB)

(72) Inventors: Thomas Kniplitsch, Insheim (DE); Jens Wilke, Ettlingen (DE)

(73) Assignee: Marvell World Trade Ltd., St. Michael (BB)

( * ) Notice: Subject to any disclaimer, the term of this patent is extended or adjusted under 35 U.S.C. 154(b) by 242 days.

(21) Appl. No.: 13/662,177

(22) Filed: Oct. 26, 2012

(65) Prior Publication Data

US 2013/0117408 A1   May 9, 2013

Related U.S. Application Data

(60) Provisional application No. 61/555,453, filed on Nov. 3, 2011.

(51) Int. Cl.
  *G06F 15/16*   (2006.01)
  *H04L 29/08*   (2006.01)
  *H04L 12/863*  (2013.01)

(52) U.S. Cl.
  CPC .......... *H04L 67/322* (2013.01); *H04L 47/6215* (2013.01); *H04L 67/325* (2013.01)
  USPC ........................................ 709/217; 709/224

(58) Field of Classification Search
  CPC ............................ H04L 67/322; H04L 67/325
  USPC .......................... 709/200–203, 217–227, 228
  See application file for complete search history.

(56) References Cited

U.S. PATENT DOCUMENTS

| | | | |
|---|---|---|---|
| 6,738,972 B1 * | 5/2004 | Willard et al. | 718/103 |
| 7,545,745 B1 | 6/2009 | Cherchali et al. | |
| 2004/0114516 A1 | 6/2004 | Iwata et al. | |
| 2006/0251119 A1 * | 11/2006 | Ramesh | 370/468 |
| 2008/0056192 A1 | 3/2008 | Strong et al. | |
| 2011/0149967 A1 | 6/2011 | Chen et al. | |
| 2014/0219256 A1 * | 8/2014 | Viger et al. | 370/336 |

FOREIGN PATENT DOCUMENTS

WO   WO-2013064907   5/2013

OTHER PUBLICATIONS

"PCT Search Report and Written Opinion", Application No. PCT/IB2012/002744, Jun. 10, 2013, 13 pages.

* cited by examiner

*Primary Examiner* — Moustafa M Meky

(57) ABSTRACT

The present disclosure describes techniques and apparatuses for arbitration of time-sensitive data transmissions. In some aspects a start of the first scheduled data transmission may be advanced effective to increase the duration of time between an end of the first scheduled data transmission and a start of a second scheduled data transmission. A non-scheduled data transmission can then be performed during the increased duration of time between the end of the advanced first scheduled data transmission and the start of the second scheduled data transmission.

20 Claims, 8 Drawing Sheets

METHOD AND APPARATUS FOR ARBITRATION OF TIME-SENSITIVE DATA TRANSMISSIONS

CROSS REFERENCE TO RELATED APPLICATION

This present disclosure claims priority to U.S. Provisional Patent Application Ser. No. 61/555,453 filed Nov. 3, 2011, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication networks allow users to distribute or stream multimedia data to various computing and electronic devices. These communication networks may be time-aware networks, which enable synchronized presentation of multimedia data via one or more remote devices. Compliance with timing constraints of a time-aware network is typically achieved by transmitting multimedia data at scheduled intervals. These scheduled transmissions are intended to ensure timely delivery of the multimedia data to the remote devices to enable synchronized presentation.

Most communication networks and devices, however, also communicate other types of data, the transmission of which can occur at unscheduled times. The unscheduled transmissions of these other types of data may prevent, or interfere with, the scheduled transmissions of the multimedia data. For example, an ongoing transmission of the other type of data can preempt a start of a scheduled transmission of multimedia data. Preempting the scheduled transmission may delay communication of the multimedia data over the time-aware network until the ongoing transmission of the other data is complete. Delaying transmission of the multimedia data, however, may violate timing constraints of the time-aware network, disrupt the synchronized presentation of the multimedia data, or compromise subsequent network communications.

SUMMARY

This summary is provided to introduce subject matter that is further described below in the Detailed Description and Drawings. Accordingly, this Summary should not be considered to describe essential features nor used to limit the scope of the claimed subject matter.

A method is described for determining whether a duration of time between an end of a first scheduled data transmission and a beginning of a second scheduled data transmission is sufficient to perform a non-scheduled data transmission. Responsive to determining that the duration of time is not sufficient to perform the non-scheduled data transmission, a start of the first scheduled data transmission is advanced effective to increase the duration of time between the end of the first scheduled data transmission and the beginning of the second scheduled data transmission. The non-scheduled data transmission is then performed during the increased duration of time between the end of the advanced first scheduled data transmission and the beginning of the second scheduled data transmission.

Another method is described for determining whether durations of time preceding and following a scheduled data transmission are sufficient, if combined, to perform a non-scheduled data transmission. A start of the scheduled data transmission is advanced effective to combine the durations of time if the combined durations of time are sufficient to perform a non-scheduled data transmission. Starts of the scheduled data transmission and a subsequent scheduled data transmission are advanced to increase a duration of time following the subsequent scheduled data transmission if the combined durations of time are not sufficient to perform the non-scheduled data transmission, the increased duration of time following the subsequent scheduled data transmission being greater than the combined durations of time. The non-scheduled data transmission is then performed during the combined durations of time or the increased duration of time following the advanced subsequent scheduled data transmission.

A System-on-Chip (SoC) is described that includes a data arbiter to determine whether a duration of time between when a scheduled transmission of a first packet of time-sensitive data ends and when a scheduled transmission of a second packet of time-sensitive data begins is sufficient to perform a transmission of a packet of non-time-sensitive data. The data arbiter advances a start of the scheduled transmission of the first packet of time-sensitive data effective to increase the duration of time between when the scheduled transmission of the first packet of time-sensitive data ends and when the scheduled transmission of the second packet of time-sensitive data begins if the duration of time is not sufficient to perform the transmission of the packet of non-time-sensitive data. The data arbiter then performs the transmission of the packet of non-time-sensitive data during the increased duration of time between when the advanced scheduled transmission of the first packet of time-sensitive data ends and when the scheduled transmission of the second packet of time-sensitive data begins.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for transmitting time-sensitive data packets at scheduled intervals may block transmissions of large non-scheduled data transmissions or permit non-scheduled data transmissions to preempt or delay the scheduled transmissions of the time-sensitive data packets. Delaying the scheduled transmissions, however, may violate timing constraints of a time-aware network or disrupt a time-based functionality associated with the time-sensitive packets. This disclosure describes apparatuses and techniques for arbitrating time-sensitive data transmissions. A start of the first scheduled data transmission may be advanced effective to increase the duration of time between an end of a first scheduled data transmission and a beginning of a second scheduled data transmission. A non-scheduled data transmission can then be performed during the increased duration of time between the end of the advanced first scheduled transmission and the beginning of the second scheduled transmission. By so doing, communicative bandwidth for both types of transmissions can be preserved without delaying the scheduled data transmissions.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
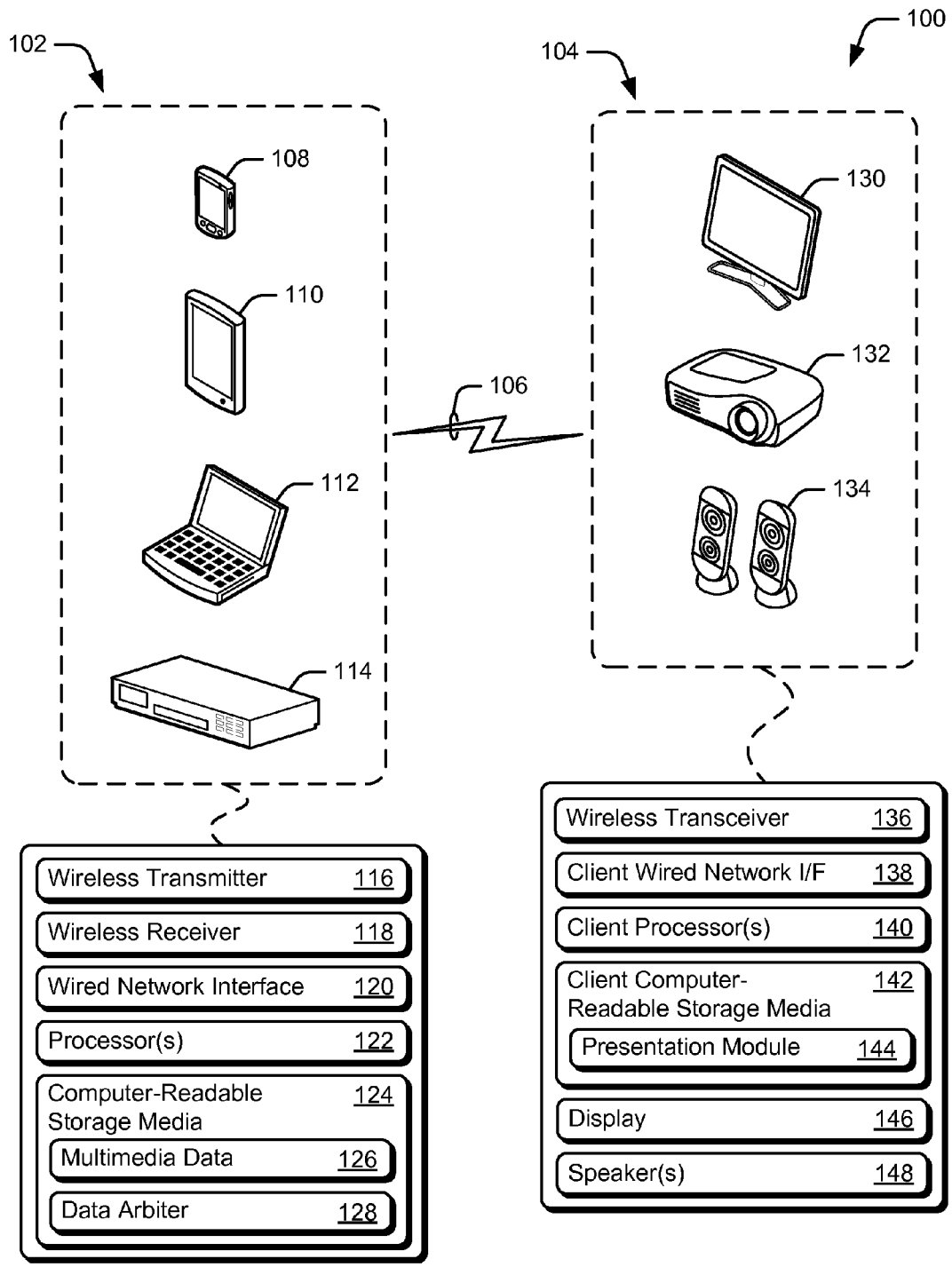
FIG. 1 illustrates an operating environment having networked devices in accordance with one or more aspects.

FIG. 1 illustrates an example operating environment 100 having multimedia host devices 102 (host devices 102) and multimedia client devices 104 (client devices 104), each of which are networked and capable of communicating data, packets, and/or frames over communication link 106. Communication link 106 may be a wired communication link, wireless communication link, or any suitable combination thereof. For example, communication link 106 may be implemented in whole or part as a local-area-network (LAN), fiber optic network, a wireless local-area-network (WLAN), or short-range wireless network. Communication link 106 may also be implemented via a time-aware network, as described below. Host devices 102 include smart-phone 108, tablet computer 110, laptop computer 112, and set-top box device 114 (set-top box 114). Although not shown, other configurations of host devices 102 are also contemplated such as a desktop computer, server, media server, network-attached storage device (NAS device), mobile-internet device (MID), gaming console, router, mobile hotspot, access point, and so on.

Each host device 102 may include a wireless transmitter 116 and a wireless receiver 118 for providing a communication interface to handle various wireless communication protocols, such as for example 3rd Generation Partnership Project Long-Term Evolution (3GPP LTE), Bluetooth™, or IEEE 802.11-2007, IEEE 802.11n, and the like. Transmitter 116 and receiver 118 may be separate (shown) or combined (not shown) and may be hardware combined with or separate from firmware or software. Host devices 102 also include wired network interface 120 for providing a communication interface to handle various wired communication protocols such as IEEE 1722, IEEE 802.3bh, IEEE 802.1AS, IEEE 802.1Qat, IEEE 802.1Qav, and the like. Wired network interface 120 may be configured in any suitable fashion, such as composed of a medium access controller (MAC) and a physical layer (PHY), which may be hardware combined with or separate from firmware or software.

These various communication protocols may define, or operate in compliance with, a time-aware network, which is described below. Alternately or additionally, aspects of a wired or wireless communication protocol may be combined with, or used to modify, features of any other communication protocol without departing from the spirit of concepts presented herein. For example, features of a wired communication protocol may be implemented via a wireless communication interface to implement one or more aspects described herein over a wireless network.

Host devices 102 also include processor(s) 122 and computer-readable storage media 124 (CRM 124). Processor 122 may be a single core or multiple core processor composed of a variety of materials, such as silicon, polysilicon, high-K dielectric, copper, and so on. CRM 124 may include any suitable memory or storage device such as random-access memory (RAM), static RAM (SRAM), dynamic RAM (DRAM), non-volatile RAM (NVRAM), read-only memory (ROM), or Flash memory useful to store data of applications and/or an operating system of the host device 102.

CRM 124 includes multimedia data 126 and data arbiter 128, which, in one implementation, is embodied on CRM 124 (as shown). Alternately or additionally, data arbiter 128 may be implemented in whole or part as hardware logic or circuitry integrated with or separate from other components of host device 102 (e.g., wired network interface 120). How data arbiter 128 is implemented and used varies and is described below. Multimedia data 126 may include any suitable type of data, such as audio data, video data, or a combination thereof. Multimedia data may be time-sensitive data, the communication of which is sensitive to time or timing constraints of an associated network. Multimedia data 126 may be communicated in accordance with any suitable communication protocol or standard, such as section 3 or section 5 of IEEE 1722-2011. For example, multimedia data 126 may be audio-video bridging (AVB) data communicated via a time-based network to client devices 104 for synchronized presentation. Alternately or additionally, multimedia data 126 may be formatted as audio/video transport protocol (AVTP) data or frames for streaming in accordance with any suitable layer-2 transport protocol (e.g., IEEE 1722).

Client devices 104 include internet-protocol (IP) enabled television 130 (IP TV 130), projector 132, and wireless speakers 134. Other implementations of client device 104 contemplated include various peripherals and/or media devices, such as monitors, video cameras, digital picture frames, LCD-based displays, transducers, sub-woofers, human-input devices, and so on. Each client device 104 may render, decode, and/or present multimedia data 126 received from a host device 102 via communication link 106. For example, IP TV 130 and speakers 134 may use multimedia data 126 received from set-top box 114 to present synchronized multimedia content to users.

Each client device 104 may include wireless transceiver 136, which provides a communication interface to handle various wireless communication protocols, such as those mentioned above and elsewhere herein. Although shown as a single transceiver, wireless transceiver 136 may be implemented as a separate transmitter and receiver, and may be hardware combined with or separate from firmware or software.

Client devices 104 also include client wired network interface 138 (client wired network I/F 138) for providing a communication interface to handle various wired communication protocols such as those mentioned above and elsewhere herein. Client wired network I/F 138 may be configured in any suitable fashion, such as composed of a medium access controller (MAC) and a physical layer (PHY), which may be hardware combined with or separate from firmware or software.

Client devices 104 also include client processor(s) 140, client computer-readable storage media 142 (client CRM 142), and multimedia presentation module 144 (presentation module 144), which, in one implementation, is embodied on client CRM 142. Client CRM 142 may include any suitable memory or storage device such as RAM, SRAM, DRAM, EEPROM, ROM, or Flash memory useful to store data of applications and/or an operating system of the client device 104.

Presentation module 144 may enable synchronized presentation of multimedia content by one or more client devices 104. For example, presentation module 144 may receive multimedia data 126 from a host device 102 and synchronize rendering of the multimedia data 126 at a client device 104. Presentation module 144 may also extract timing information from multimedia data 126, which may be useful to synchronize the rendering or presentation of multimedia data 126 at a client device 104.

Client devices 104 may also include display 146 and/or speaker(s) 148 to present visually and/or audibly perceptible multimedia content. Rendered or decoded multimedia data 126 of client device 104 may be presented as multimedia content via display 146 or speakers 148. For example, wireless speakers 134 may decode a stream of multimedia data 126 (e.g., audio data) as music for presentation via one or more internal speakers 148.

Figure 2:
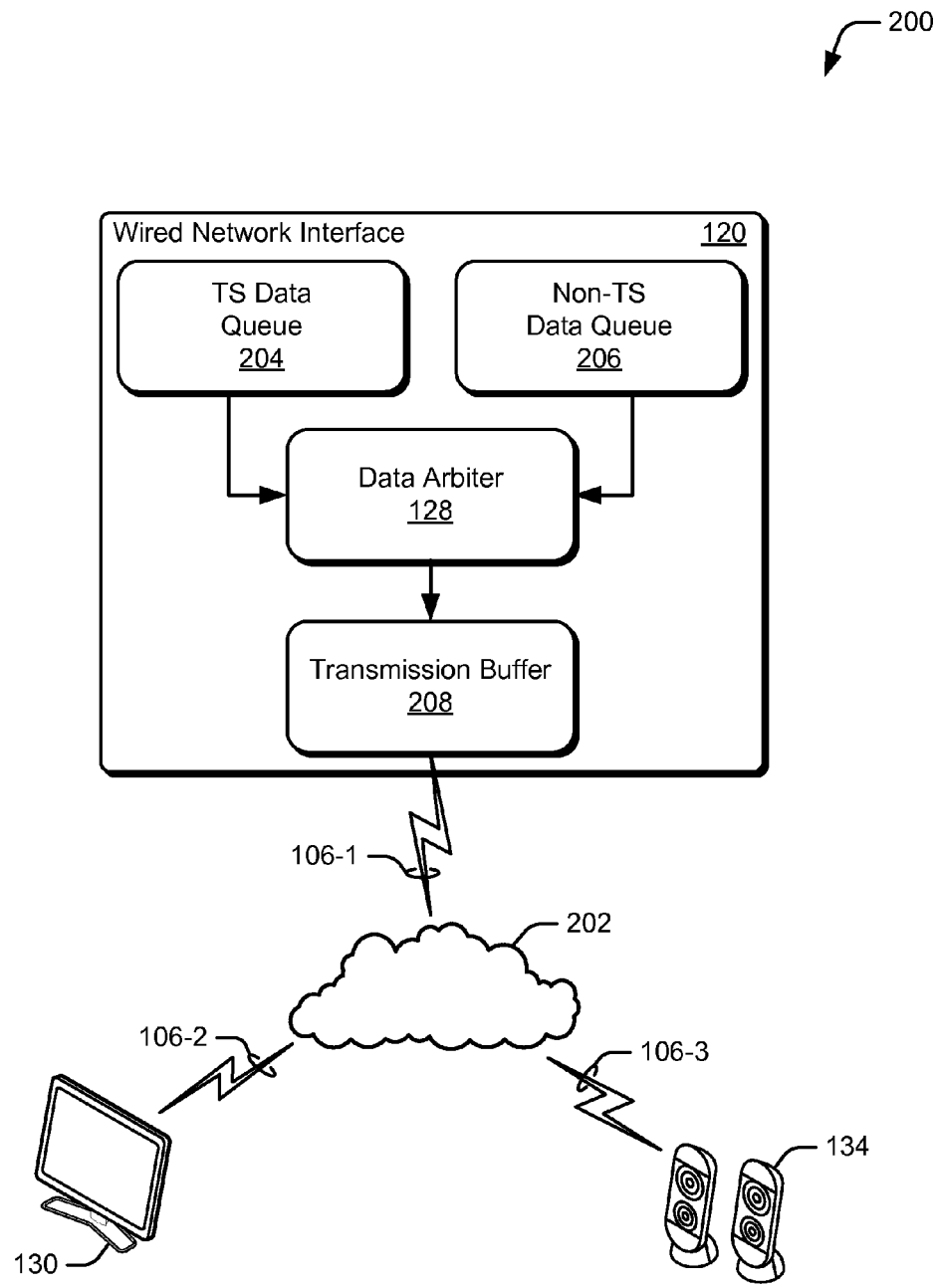
FIG. 2 illustrates an example of networked devices of FIG. 1 communicating in accordance with one or more aspects.

FIG. 2 illustrates an example of device environment 200 that includes a wired network interface 120 of a host device 102, which is streaming multimedia data 126 (not shown) to IP TV 130 and wireless speakers 134 via time-aware network 202. In this particular example, communication with time-aware network 202 is implemented via communication links 106-1, 106-2, and 106-3, which may be wired or wireless communication links as described above. Time-aware network 202 may implement any suitable communication protocol, such as IEEE 1722, IEEE 802.3bh, IEEE 802.1AS, IEEE 802.1Qat, IEEE 802.1Qav, and the like. Time-aware network 202 enables one or more client devices 104 to perform synchronized functions. For example, time-aware network 202 may enable synchronous presentation of multimedia data by IP TV 130 and wireless speakers 134.

In the context of the present example, wired network interface 120 streams multimedia data 126 over time-aware network 202 via communication link 106-1. Alternately or additionally, multimedia data 126 may be streamed by a wireless communication interface, such as that provided by wireless transmitter 116 and wireless receiver 118. Wired network interface 120 may include time-sensitive data queue 204 (TS data queue 204), non-time-sensitive data queue 206 (Non-TS data queue 206), data arbiter 128, and transmission buffer 208.

TS date queue 204 may include a buffer for receiving and/or storing time-sensitive data packets, such as packetized multimedia data 126. Non-TS data queue 206 may include a buffer for receiving and/or storing non-time-sensitive data packets, such as data packets associated with internet browsing, email, data applications, background programs, communication link status/control information, and so on. Data packets from either or both of TS data queue 204 and non-TS data queue 206 may be sent to transmission buffer 208 for transmission via communication link 106. Transmission buffer 208 may be a first-in-first-out (FIFO) buffer configured to stream data packets to time-aware network 202 via communication link 106-1.

Data arbiter 128 may control or affect a flow of data packets from TS data queue 204 and non-TS data queue 206 to transmission buffer 208. Data arbiter 128 may also be aware of various parameters associated with data packets of TS data queue 204, such as a size of TS data packets, amounts of time consumed to transmit respective TS data packets, and/or a schedule at which the TS data packets are to be transmitted via time-aware network 202. Alternately or additionally, data arbiter 128 may be aware of a size of data packets in non-TS data queue 206 and an amount of time consumed to transmit the data packets of non-TS data queue 206. In at least some instances, data arbiter 128 may advance a scheduled transmission of a data packet from TS data queue 204 to avoid contention with transmissions of data packets from non-TS data queue 206.

In some cases, data arbiter 128 is configured to advance scheduled transmissions of (e.g., pre-launch) data packets from TS data queue 204 based on a predefined or configurable amount of time. In such cases, a programmable register of data arbiter 128 may be set to advance scheduled transmissions of AVB data packets by approximately 13 microseconds. This can be effective to permit maximum size non-AVB data packets to be transmitted without delaying or blocking transmissions of the AVB data packets. Additional and alternative ways in which data arbiter 128 may be implemented and used vary and are described below.

Techniques for Arbitration of Time-Sensitive Data Transmissions The following discussion describes techniques for arbitration of time-sensitive data transmissions. These techniques can be implemented using the previously described environments or entities, such as data arbiter 128 of FIG. 1 embodied on a host device 102. These techniques include methods illustrated in FIGS. 3, 5, and 7, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
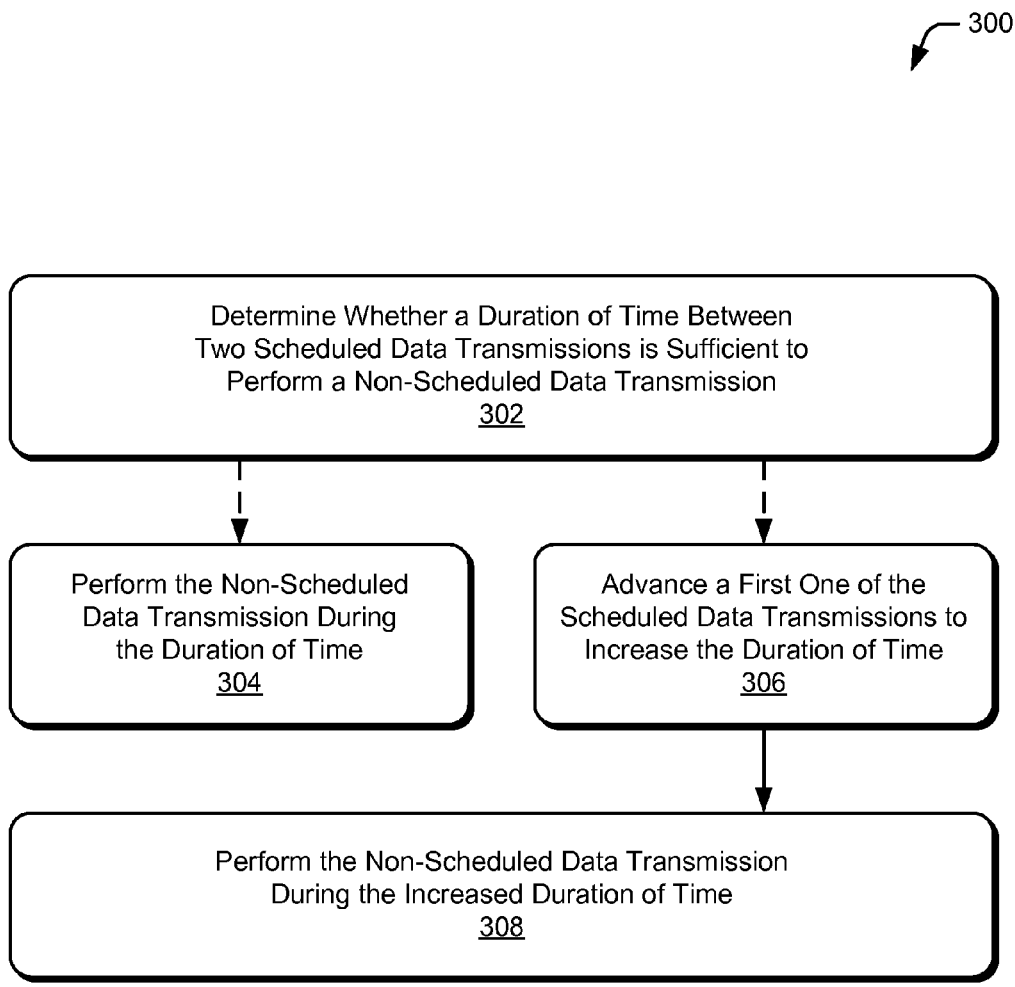
FIG. 3 illustrates a method of advancing a start of a scheduled data transmission.

FIG. 3 depicts a method 300 for advancing a start of a scheduled data transmission, including operations that can be performed by data arbiter 128 of FIG. 1.

At 302, it is determined whether a duration of time between an end of a first scheduled data transmission and a beginning of a second scheduled data transmission is sufficient to perform a non-scheduled data transmission. The first scheduled data transmission or the second scheduled data transmission may be a transmission of time-sensitive data, such as multimedia data for transmission via a time-aware network. The non-scheduled data transmission may be for non-time-sensitive data, such as internet browser data or data associated with a network-enabled application. The scheduled data transmissions may be scheduled to start at regular or periodic intervals.

As an example, consider wired network interface 120 in the context of FIG. 2, which shows wired network interface 120 streaming multimedia data 126 to IP TV 130 and wireless speakers 134. Assume here TS data queue 204 includes time-sensitive data in the form of packets of multimedia data 126 and non-TS data queue 206 includes packets of internet browsing data. Also assume that the packets of time-sensitive data of TS data queue 204 are scheduled for transmission at particular times.

Figure 4:
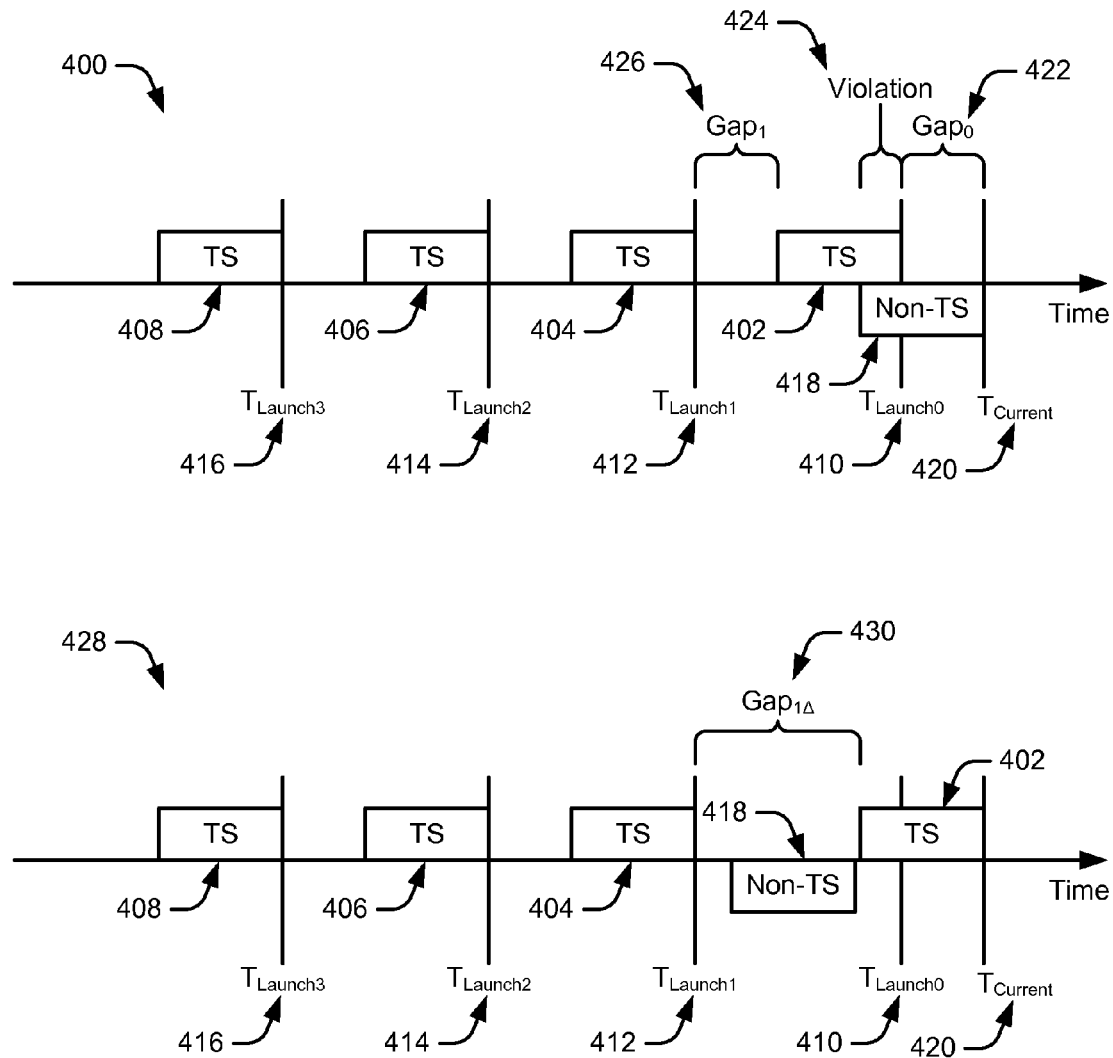
FIG. 4 illustrates an example timeline of data transmissions in accordance with one or more aspects.

In the context of the present example, consider timeline 400 of FIG. 4. Timeline 400 includes TS data packets 402, 404, 406, and 408, which are scheduled at respective launch times $T_{Launch0}$ 410, $T_{Launch1}$ 412, $T_{Launch2}$ 414, and $T_{Launch3}$ 416. Timeline 400 also includes non-TS data packet 418 (e.g., a packet of internet browsing data), the transmission of which is not scheduled, but could occur as early as current time $T_{Current}$ 420. It should be noted, however, that timing $gap_0$ 422 ($Gap_0$ 422) between $T_{Current}$ 420 and $T_{Launch0}$ 410 is not sufficient to transmit non-TS data packet 418 without delaying transmission of TS data packet 402 resulting in timing violation 424.

Here data arbiter 128 of wired network interface 120 determines whether timing $gap_1$ 426 ($Gap_1$ 426) between TS data packet 402 and TS data packet 404 is sufficient to transmit non-TS data packet 418. In some cases, data arbiter 128 determines whether non-TS data packet 418 can be transmitted during $Gap_1$ 426 without causing another timing violation, such as delaying transmission of another TS data packet. In the context of the present example, data arbiter 128 determines that $Gap_1$ 426 is not sufficient to transmit non-TS data packet 418. Specifically, a duration of time consumed by a transmission of non-TS data packet 418 is greater than $Gap_1$ 426.

From operation 302, method 300 may proceed to operation 304 or operation 306. Method 300 proceeds to operation 304 if the duration of time between the end of the first scheduled transmission and the beginning of the second scheduled transmission is sufficient to perform the non-scheduled data transmission. Method 300 proceeds to operation 306 if the duration of time between the end of the first scheduled transmission and the beginning of the second scheduled transmission is not sufficient to perform the non-scheduled data transmission.

At 304, the non-scheduled data transmission is performed during the duration of time between the end of the first scheduled transmission and the beginning of the second scheduled transmission. In some cases, transmission of the non-scheduled data packet is delayed until the duration of time is encountered. This can be effective to prevent transmission of the non-scheduled data packet from delaying other scheduled data transmissions.

At 306, a start of the first scheduled data transmission is advanced effective to increase the duration of time between the end of the first scheduled data transmission and the beginning of the second scheduled data transmission. In some cases, the start of the first scheduled data transmission may be advanced to a current time. In other cases, the start of the first scheduled data transmission may be advanced based on a length of a non-scheduled data transmission. For example, the start of the data transmission may be advanced sufficient to increase the duration of time such that a potential timing violation with the start of the second scheduled data transmission is avoided. The start of the first scheduled data packet may be advanced by an amount of time consumed by transmitting a non-time sensitive data packet. For instance, a size of a non-sensitive data packet may be about 1522 bytes, which at 125 MHz consumes about 13 microseconds to transmit. In cases of Gigabit-Ethernet (GE), a maximum size of an interfering non-AVB data packet may be 1542 bytes that consumes 12.336 microseconds to transmit (1542 bytes*8 bit*1 ns=12.336 microseconds). Accordingly, a scheduled data transmission may be advanced by approximately thirteen microseconds to accommodate transmissions of non-AVB data packets.

Continuing the ongoing example, data arbiter 128 advances a start of a transmission of TS data packet 402 to $T_{Current}$ 420, as shown by timeline 428 of FIG. 4. By so doing, data arbiter 128 is able to increase $Gap_1$ 426 to $Gap_{1A}$ 430, which is sufficiently long to transmit non-TS data packet 418.

At 308, the non-scheduled data is transmitted during the increased duration of time between the end of the advanced first scheduled transmission and the beginning of the second scheduled transmission. Transmitting the non-scheduled data packet may include causing or initiating the transmission via a component of a network interface, such as a transmission buffer or FIFO buffer. Transmitting the non-scheduled data packet during the increased duration of time may include delaying transmission of the non-scheduled data packet until the increased duration of time is encountered.

In the context of the present example, data arbiter 128 initiates transmission of non-TS data packet 418 during $Gap_{1A}$ 430, as shown by timeline 428 of FIG. 4. It should be noted that by advancing a start of the transmission of TS data packet 402 permits the transmission of non-TS data packet 418 without delaying any of TS data packets 402-408. Concluding the present example, TS data packet 402 is transmitted to IP TV 130 and wireless speakers 134 via time-aware network 202. A presentation module 144 of each respective device then decodes TS data packet 402 (and subsequent TS data packets of the stream of multimedia data 126) and presents synchronized multimedia content.

Figure 5:
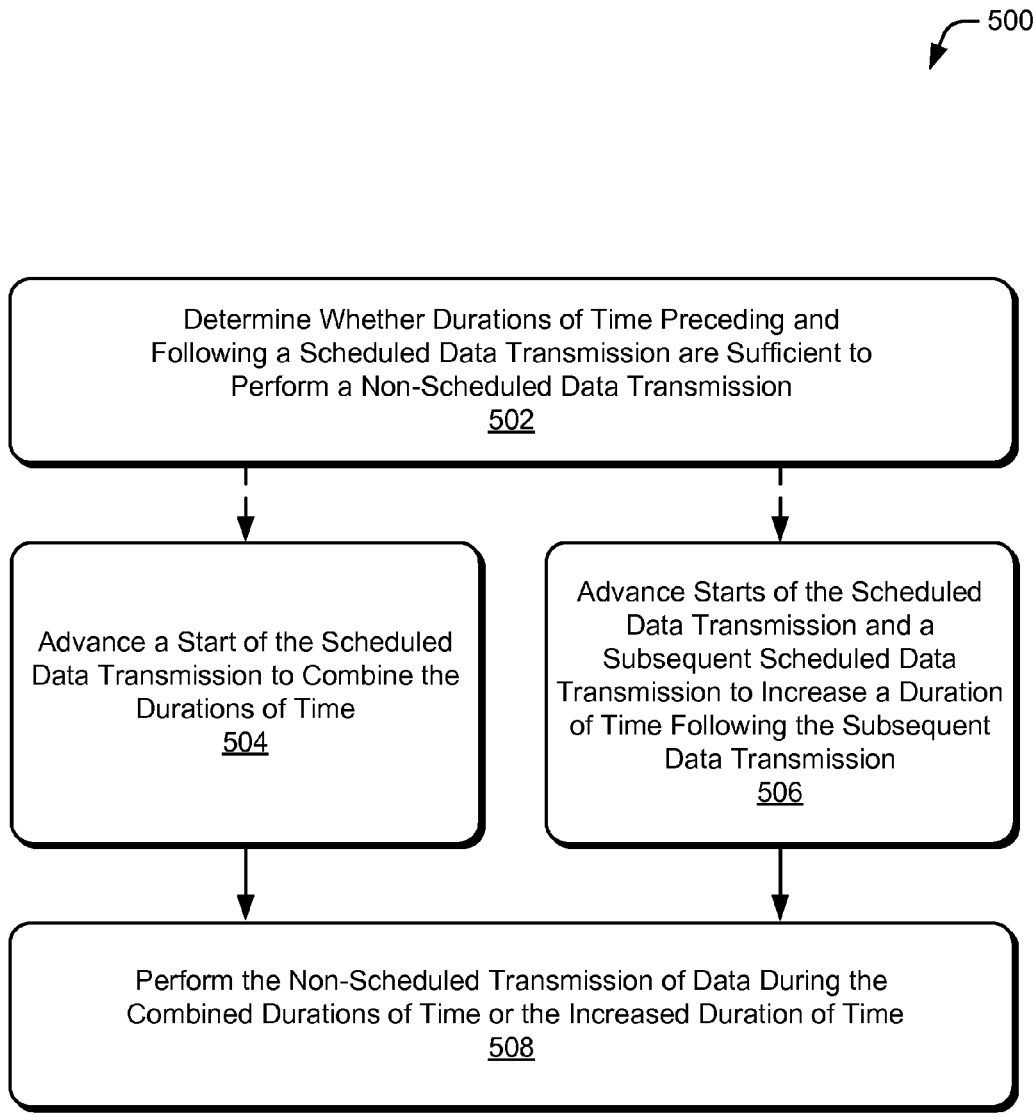
FIG. 5 illustrates a method of advancing starts of multiple scheduled data transmissions.

FIG. 5 depicts a method 500 for advancing starts of multiple scheduled data transmissions, including operations that can be performed by data arbiter 128 of FIG. 1.

At 502, it is determined whether durations of time preceding and following a scheduled data transmission, if combined, are sufficient to perform a non-scheduled data transmission. The duration of time preceding the scheduled data transmission may be a duration of time from a current time to the start of a scheduled data transmission. The duration of time following the scheduled data transmission may be a duration of time from the end of the scheduled transmission to the start of a next scheduled data transmission.

The scheduled data transmission or the next scheduled data transmission may be a transmission of time-sensitive data, such as multimedia data for transmission via a time-aware network. The non-scheduled data transmission may be for non-time-sensitive data, such as internet browser data or data associated with a network-enabled application. The scheduled data transmissions may be scheduled to start at regular or periodic intervals.

As another example, consider wired network interface 120 once more in the context of FIG. 2, in which wired network interface 120 streams multimedia data 126 to IP TV 130 and wireless speakers 134. Assume here TS data queue 204 includes time-sensitive data in the form of packets of multimedia data 126 and non-TS data queue 206 includes packets of internet browsing data. Also assume that the packets of time-sensitive data of TS data queue 204 are scheduled for transmission at particular times.

Figure 6:
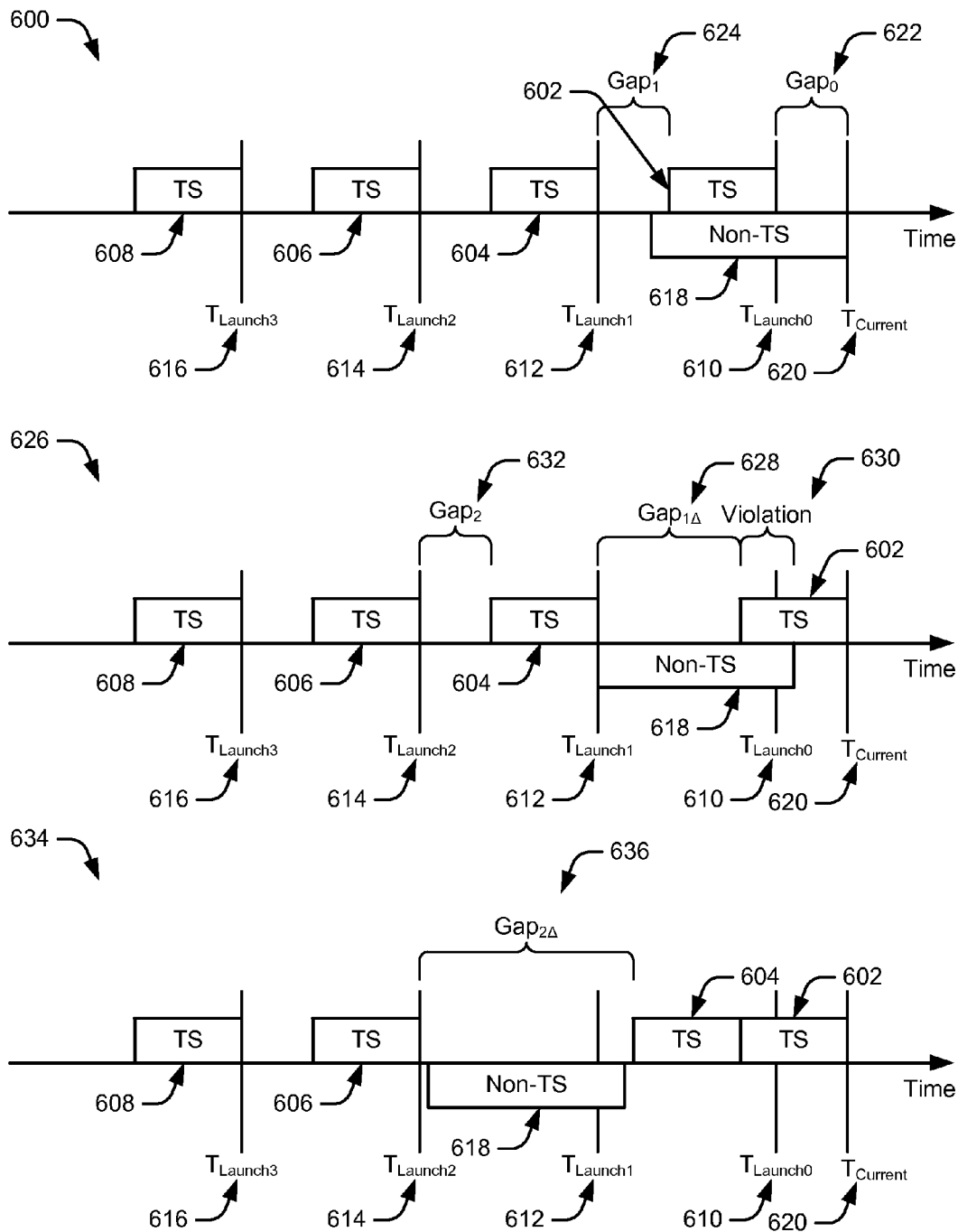
FIG. 6 illustrates another example timeline of data transmissions in accordance with one or more aspects.

In the context of the present example, consider timeline 600 of FIG. 6 that includes TS data packets 602, 604, 606, and 608, which are scheduled at respective launch times $T_{Launch0}$ 610, $T_{Launch1}$ 612, $T_{Launch2}$ 614, and $T_{Launch3}$ 616. Timeline 600 also includes non-TS data packet 618 (e.g., a packet of email data), the transmission of which is not scheduled, but could occur as early as current time $T_{Current}$ 620. It should be noted however, that timing $gap_0$ 622 ($Gap_0$ 622) preceding between TS data packet 602 and timing $gap_1$ 624 ($Gap_1$ 624), either separately or combined, are sufficient to transmit non-TS data packet 618 without delaying or blocking transmission of TS data packet 602.

Here data arbiter 128 of wired network interface 120 determines whether $Gap_0$ 622 and $Gap_1$ 624 are sufficient to transmit non-TS data packet 618. In some cases, data arbiter 128 determines whether non-TS data packet 618 can be transmitted during $Gap_0$ 622 and $Gap_1$ 624 if combined by advancing transmission of TS data packet 602. In the context of the present example, data arbiter 128 determines that $Gap_0$ 622 and $Gap_1$ 624 are not sufficient to transmit non-TS data packet 618, which is shown by timeline 626 of FIG. 6. Here, a transmission duration of non-TS data packet 618 exceeds $Gap_{1A}$ 628, resulting in timing violation 630.

From operation 502, method 500 can proceed to either operation 504 or operation 506. Method 500 may proceed to operation 504 if the durations of time preceding and following the scheduled data transmission are sufficient to perform the non-scheduled data transmission. Method 500 may proceed to operation 506 if the durations of time preceding and following the scheduled data transmission are not sufficient to perform the non-scheduled data transmission.

At 504, a start of the scheduled data transmission is advanced effective to combine the durations of time preceding and following the scheduled data transmission. This may be effective to increase the duration of time following the scheduled data transmission sufficient to perform the non-scheduled data transmission. In some cases, an amount of time by which the start of the scheduled data transmission is capped or limited by a timing constraint of a communication protocol. For example, an amount of time by which a start of a transmission of an AVB data packet may not exceed a maximum timing uncertainty as defined by IEEE 1722 (e.g., 125 microseconds).

At 506, starts of the scheduled data transmission and a subsequent scheduled data transmission are advanced effective to increase the duration of time following the subsequent scheduled data transmission. In some cases, the start of the subsequent scheduled data transmission is advanced to immediately follow the end of the advanced scheduled data transmission. The increased duration of time following the advanced subsequent scheduled data transmission (e.g., $Gap_{2A}$ 636) may be greater than a duration of time following the advanced scheduled data transmission ($Gap_{1A}$ 628).

Continuing the ongoing example, data arbiter 128 advances starts of transmissions of TS data packet 602 and TS data packet 604. Here, the start of TS data packet 602 is advanced to $T_{Current}$ 420, as shown by timeline 634 of FIG. 6. The start of TS data packet 604 is advanced to immediately follow an end of advanced TS data packet 602. By so doing, data arbiter 128 is able to increase $Gap_2$ 632 to $Gap_{2A}$ 636, which is sufficiently long to transmit non-TS data packet 618.

At 508, the non-scheduled data is transmitted during the increased duration of time between the end of the advanced first scheduled transmission and the beginning of the second scheduled transmission. Transmitting the non-scheduled data packet may include causing or initiating the transmission via a component of a network interface, such as a transmission buffer or FIFO buffer. Transmitting the non-scheduled data packet during the increased duration of time may include delaying transmission of the non-scheduled data packet until the increased duration of time is encountered.

In the context of the present example, data arbiter 128 initiates transmission of TS data packet 618 during $Gap_{2A}$ 636, as shown by timeline 634 of FIG. 6. It should be noted that by advancing starts of the transmissions of TS data packet 602 and TS data packet 604 permits the transmission of non-TS data packet 618 without delaying any of TS data packets 602-608. Concluding the present example, TS data packet 602 and TS data packet 604 are transmitted to IP TV 130 and wireless speakers 134 via time-aware network 202. A presentation module 144 of each respective device then decodes TS data packet 602 and TS data packet 604 (and subsequent TS data packets of the stream of multimedia data 126) and presents synchronized multimedia content.

Figure 7:
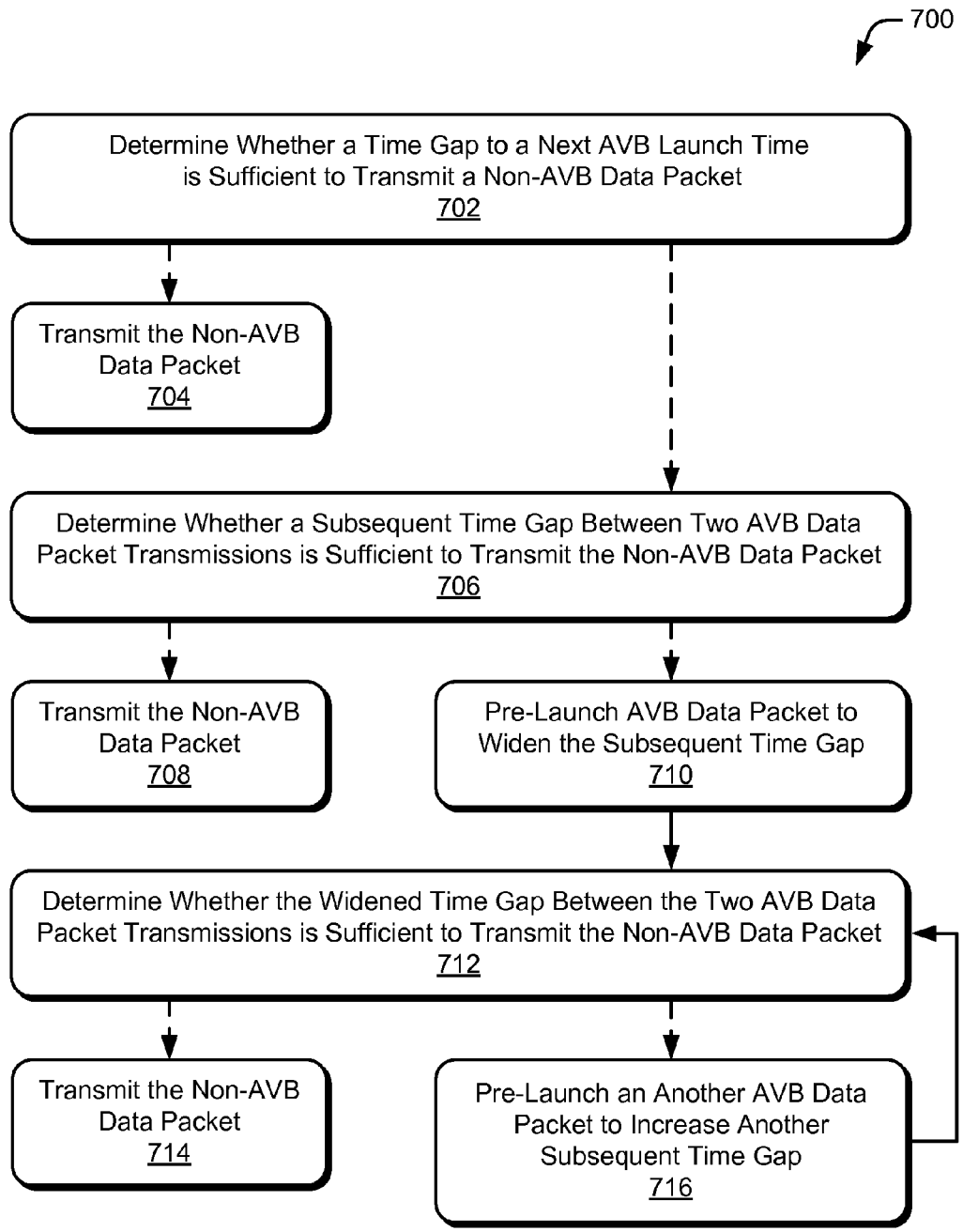
FIG. 7 illustrates a method of pre-launching audio-video bridging (AVB) data in accordance with one or more aspects.

FIG. 7 depicts a method 700 for pre-launching data, including one or more operations that can be performed by data arbiter 128 of FIG. 1.

At 702, it is determined whether a time gap between a current time and a next audio-video bridging data launch time (AVB launch time) is sufficient to transmit a non-AVB data packet. The AVB launch times may be scheduled in compliance for transmitting the AVB data over a time-aware network, such as an IEEE 1722 compliant network. In the context of IEEE 1722, an AVB launch time may be calculated as an AVB presentation time minus an AVB maximum transmission time (e.g., network latency).

From operation 702, method 700 may proceed to operation 704 or operation 706. Method 700 proceeds to operation 704 if the time gap between the current time and the next AVB launch time is sufficient to transmit the non-AVB data packet. Method 700 proceeds to operation 706 if the time gap between the current time and the next AVB launch time is not sufficient to transmit the non-AVB data packet. At 704, the non-AVB data packet is transmitted during the time gap between the current time and the next AVB launch time.

At 706, it is determined whether a subsequent time gap between a next two AVB data packet transmissions is sufficient to transmit the non-AVB data packet. The next two AVB data packet transmissions may be scheduled to start at the next two AVB launch times. The time gap may be a duration of time between an end of a first one of the two AVB data packet transmissions and a start of a second one of the AVB data packet transmissions. Accordingly, lengths of the respective AVB data packets may be taken into consideration when determining a length or duration of the subsequent time gap.

From operation 706, method 700 may proceed to operation 708 or operation 710. Method 700 proceeds to operation 708 if the subsequent time gap between the next two AVB data packet transmissions is sufficient to transmit the non-AVB data packet. Method 700 proceeds to operation 710 if the subsequent time gap between the next two AVB data packet transmissions is not sufficient to transmit the non-AVB data packet. At 708, the non-AVB data packet is transmitted during the subsequent time gap between the next two AVB data packet transmissions. In some cases, the transmission of the non-AVB data packet is delayed until the subsequent time gap is encountered. Transmitting the non-AVB data packet during the subsequent time gap may be effective to prevent the non-AVB data packet from delaying, or interfering with, a scheduled transmission of either of the AVB data packets.

At 710, an AVB data packet is pre-launched to widen the subsequent time gap between the next two AVB data packet transmissions. Pre-launching the AVB data packet may pre-launch the next scheduled AVB data packet at a current time or next available transmission time. The AVB data packet may be pre-launched by a duration of time useful to transmit the non-AVB data packet, which may be about 13 microseconds or less.

At 712, it is determined whether the widened time gap between the two AVB data packet transmissions is sufficient to transmit the non-AVB data packet. The widened gap between the two AVB data packet transmissions may be a duration of time between the end of the first pre-launched AVB data packet transmission and the start of the second AVB data packet transmission. The start of the second AVB data packet transmission may be scheduled to occur at an AVB launch time following the AVB launch time for the first AVB data packet transmission.

From operation 712, method 700 may proceed to operation 714 or operation 716. Method 700 proceeds to operation 714 if the widened time gap between the next two AVB data packet transmissions is sufficient to transmit the non-AVB data packet. Method 700 proceeds to operation 716 if the widened time gap between the next two AVB data packet transmissions is not sufficient to transmit the non-AVB data packet. At 714, the non-AVB data packet is transmitted during the widened time gap between the next two AVB data packet transmissions. This may be effective to prevent the non-AVB data packet from delaying, or interfering with, a scheduled transmission of either of the AVB data packets.

At 716, another AVB data packet is pre-launched to increase another subsequent time gap between two AVB data packet transmissions. This may include pre-launching the second one of the next two AVB data packet transmissions effective to widen a time gap between the end of the second AVB data packet transmission and a start of a third AVB data packet transmission. In some cases, the second AVB data packet may be pre-launched immediately after the first AVB data packet is pre-launched. This may be effective to increase the subsequent time gap (e.g., a time gap between the second and a third AVB data packet transmissions) more than a preceding widened time gap (e.g., a widened time gap between the first and the second AVB data packet transmissions). From operation 716, method 700 returns to operation 712 to determine if the widened subsequent time gap between the second AVB data packet transmission and a third AVB data packet transmission is sufficient to transmit the non-AVB data packet.

Method 700 may iteratively perform operations 712, 714, and/or 716 until the non-AVB data packet is transmitted during a gap between AVB data packet transmissions. Each iteration of pre-launching another AVB data packet may result in a subsequent time gap between an end of the pre-launched AVB data packet and a start of a following AVB data packet being wider than a preceding time gap. In some cases, iterations of method 700 may be limited by a maximum amount of time by which an AVB data packet can be pre-launched, such as the maximum timing uncertainty threshold of IEEE 1722 (e.g., 125 microseconds). Accordingly, transmission of the non-AVB data packet can be achieved without delaying, or interfering with, a scheduled transmission of any of the AVB data packets.

System-on-Chip

Figure 8:
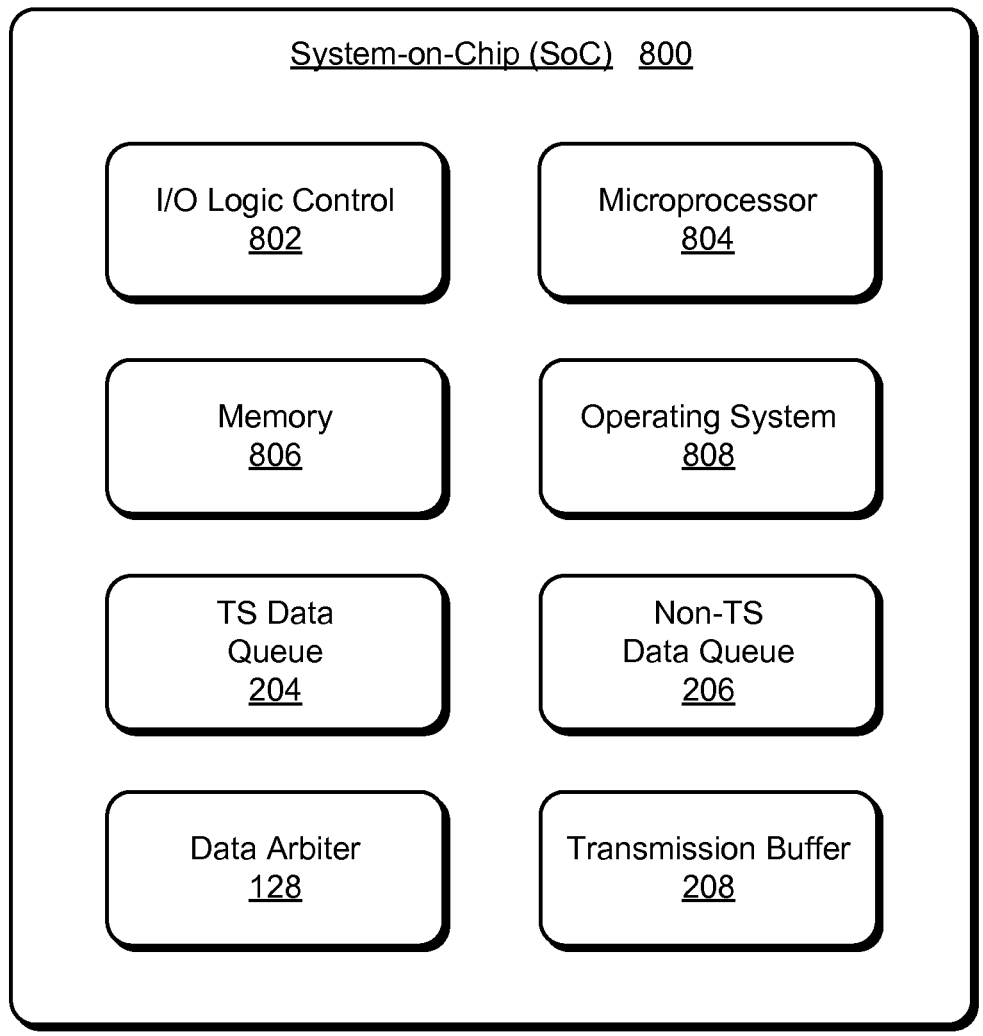
FIG. 8 illustrates a System-on-Chip (SoC) environment for implementing aspects of the techniques described herein.

FIG. 8 illustrates a System-on-Chip (SoC) 800, which can implement various aspects described above. A SoC can be implemented in any suitable device, such as a video game console, IP enabled television, smart-phone, desktop computer, laptop computer, remote control, tablet computer, server, network-enabled printer, set-top box, printer, scanner, camera, picture frame, and/or any other type of device that may communicate time-sensitive data.

SoC 800 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 800 can also include an integrated data bus (not shown) that couples the various components of the SoC for data communication between the components. A wired or wireless communication device that includes SoC 800 can also be implemented with many combinations of differing components. In some cases, these differing components may be configured to implement concepts described herein over a wired or wireless connection.

In this example, SoC 800 includes various components such as an input-output (I/O) logic control 802 (e.g., to include electronic circuitry) and a microprocessor 804 (e.g., any of a microcontroller or digital signal processor). SoC 800 also includes a memory 806, which can be any type of RAM, low-latency nonvolatile memory (e.g., Flash memory), ROM, and/or other suitable electronic data storage. SoC 800 can also include various firmware and/or software, such as an operating system 808, which can be computer-executable instructions maintained by memory 806 and executed by microprocessor 804. SoC 800 may also include various programmable control registers (not shown), such as for specifying an amount of time by which a start of a scheduled data transmission is advanced. SoC 800 can also include other various communication interfaces and components, communication components, other hardware, firmware, and/or software.

SoC 800 includes TS data queue 204, non-TS data queue 206, data arbiter 128, and transmission buffer 208 (embodied as disparate or combined components as noted above). Examples of these various components, functions, and/or entities, and their corresponding functionality, are described with reference to the respective components of the environment 100 shown in FIG. 1 and FIG. 2.

Data arbiter 128, either independently or in combination with other entities, can be implemented as computer-executable instructions maintained by memory 806 and executed by microprocessor 804 to implement various embodiments and/or features described herein. Data arbiter 128 may also be provided integral with other entities of the SoC, such as integrated with one or both of I/O logic controller 802 or any packet-based interface within SoC 800. Alternatively or additionally, data arbiter 128 and the other components can be implemented as hardware, firmware, fixed logic circuitry, or any combination thereof that is implemented in connection with the I/O logic control 802 and/or other signal processing and control circuits of SoC 800.

Although the subject matter has been described in language specific to structural features and/or methodological operations, the subject matter defined in the appended claims is not necessarily limited to the specific features or operations described above, including orders in which the features or operations are shown and/or performed.

What is claimed is:

1. A method comprising:
   determining whether a duration of time between an end of a first scheduled data transmission and a beginning of second scheduled data transmission is sufficient to perform a non-scheduled data transmission; and
   responsive to determining that the duration of time is not sufficient to perform the non-scheduled data transmission,
   i) advancing a start of the first scheduled data transmission effective to increase the duration of time between the end of the first scheduled data transmission and the beginning of the second scheduled data transmission, and
   ii) performing the non-scheduled data transmission during the increased duration of time between the end of the advanced first scheduled data transmission and the beginning of the second scheduled data transmission.

2. The method of claim 1, further comprising performing a second non-scheduled data transmission during a second duration of time between an end of the second scheduled data transmission and a beginning of a third scheduled data transmission responsive to determining that the second duration of time is sufficient to perform the second non-scheduled data transmission.

3. The method of claim 1, wherein:
the increased duration of time is a first increased duration of time; and
the method further comprises:
  determining whether the first increased duration of time between the end of the advanced first scheduled data transmission and the beginning of the second scheduled data transmission is sufficient to perform the non-scheduled data transmission, and
  responsive to determining that the first increased duration of time is not sufficient to perform the non-scheduled data transmission,
    i) advancing a start of the second scheduled data transmission effective to increase a second duration of time between an end of the second scheduled data transmission and a beginning of a third scheduled data transmission, and
    ii) performing the non-scheduled data transmission during the second increased duration of time between the end of the advanced second scheduled data transmission and the beginning of the third scheduled data transmission.

4. The method of claim 3, wherein the second increased duration of time between the end of the advanced second scheduled data transmission and the beginning of the third scheduled data transmission is greater than the first increased duration of time between the end of the advanced first scheduled data transmission and the beginning of the second scheduled data transmission.

5. The method of claim 1, wherein performing the non-scheduled data transmission during the first increased duration of time includes delaying the non-scheduled data transmission until the first increased duration of time is encountered.

6. The method of claim 1, wherein the first scheduled data transmission includes first time-sensitive data, the second scheduled data transmission includes second time-sensitive data, and the non-scheduled data transmission includes non-time-sensitive data.

7. The method of claim 6, wherein the first time-sensitive data and the second time-sensitive data are packetized for transmission in accordance with the IEEE 1722 standard.

8. The method of claim 1, wherein advancing the start of the first scheduled data transmission advances the start of the first scheduled data transmission by approximately thirteen microseconds or less.

9. One or more computer-readable memory devices comprising processor-executable instructions that, when executed by a processor, implement a data arbiter to:
  determine whether a duration of time between an end of a first scheduled data transmission and a beginning of a second scheduled data transmission is sufficient to perform a non-scheduled data transmission; and
  responsive to determining that the duration of time is not sufficient to perform the non-scheduled data transmission,
    i) advance a start of the first scheduled data transmission effective to increase the duration of time between the end of the first scheduled data transmission and the beginning of the second scheduled data transmission, and
    ii) perform the non-scheduled data transmission during the increased duration of time between the end of the advanced first scheduled data transmission and the beginning of the second scheduled data transmission.

10. The one or more computer-readable memory devices of claim 9 comprising additional processor-executable instructions that, when executed, implement the data arbiter to perform a second non-scheduled data transmission during a second duration of time between an end of the second scheduled data transmission and a beginning of a third scheduled data transmission responsive to determining that the second duration of time is sufficient to perform the second non-scheduled data transmission.

11. The one or more computer-readable memory devices of claim 9, wherein the increased duration of time is a first increased duration of time and further comprising additional processor-executable instruction that, when executed, implement the data arbiter to:
  determine whether the first increased duration of time between the end of the advanced first scheduled data transmission and the beginning of the second scheduled data transmission is sufficient to perform the non-scheduled data transmission; and
  responsive to determining that the first increased duration of time is not sufficient to perform the non-scheduled data transmission,
    i) advance a start of the second scheduled data transmission effective to increase a second duration of time between an end of the second scheduled data transmission and a beginning of a third scheduled data transmission, and
    ii) perform the non-scheduled data transmission during the second increased duration of time between the end of the advanced second scheduled data transmission and the beginning of the third scheduled data transmission.

12. The one or more computer-readable memory devices of claim 9, wherein the beginning of the first scheduled data transmission and the beginning of the second scheduled data transmission are scheduled to occur at transmission times of a time-aware multimedia network.

13. The one or more computer-readable memory devices of claim 9, wherein the start of the first scheduled data transmission is advanced based on a duration of the non-scheduled data transmission.

14. The one or more computer-readable memory devices of claim 13, wherein the non-time-sensitive data includes 1542 or fewer bytes of data.

15. A system comprising:
  a first queue storing time-sensitive data;
  a second queue storing non-time-sensitive data;
  a network interface configured to transmit packets of the time-sensitive data and packets of the non-time-sensitive data from the first queue and the second queue respectively; and
  a data arbiter configured to:
    determine whether a duration of time between when a scheduled transmission of a first packet of time-sensitive data ends and a scheduled transmission of a second packet of time-sensitive data begins is sufficient to perform a transmission of a packet of non-time-sensitive data; and responsive to determining that the duration of time is not sufficient to perform the transmission of the packet of non-time-sensitive data,
  i) advance a start of the scheduled transmission of the first packet of time-sensitive data effective to increase the duration of time between when the scheduled transmission of the first packet of time-sensitive data ends and the scheduled transmission of the second packet of time-sensitive data begins, and
  ii) perform the transmission of the packet of non-time-sensitive data during the increased duration of time between when the advanced scheduled transmission of the first packet of time-sensitive data ends and the scheduled transmission of the second packet of time-sensitive data begins.

16. The system of claim 15, wherein the system is embodied as an Ethernet controller of a media host device and configured to transmit the packets of time-sensitive data to one or more media client devices via the network interface.

17. The system of claim 15, further comprising a programmable control register associated with the data arbiter that is configurable to set an amount of time by which the start of the scheduled transmission of the first packet of time-sensitive data is advanced.

18. The system of claim 15, wherein the network interface is a wired network interface configured to operate in compliance with the IEEE 1722 standard.

19. The system of claim 15, wherein the packets of time-sensitive data are packets of audio-video bridging (AVB) data and the packets of non-time-sensitive data are packets of non-AVB data.

20. The system of claim 15, wherein the system is embodied as a System-on-Chip.

* * * * *